Patented May 30, 1933

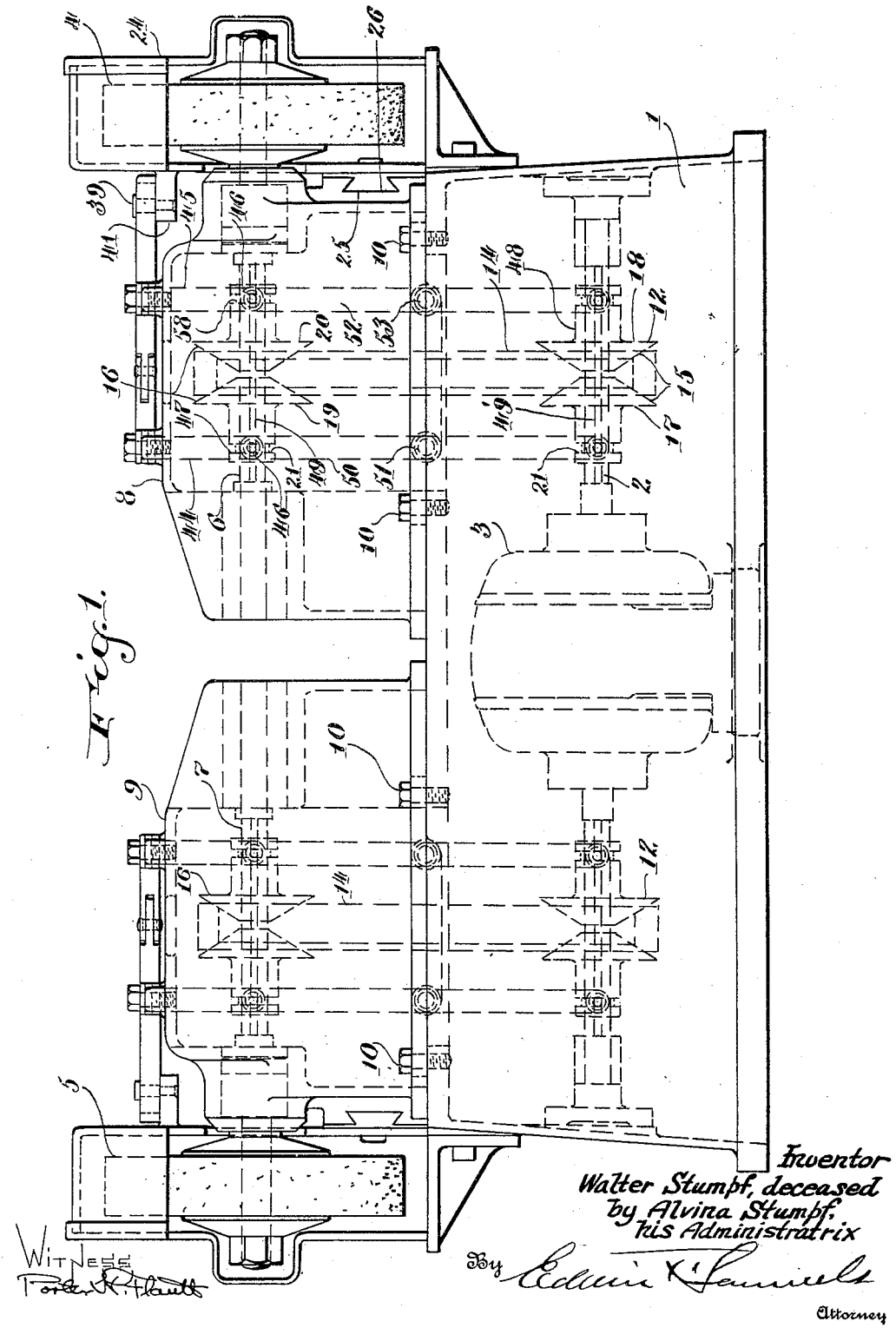

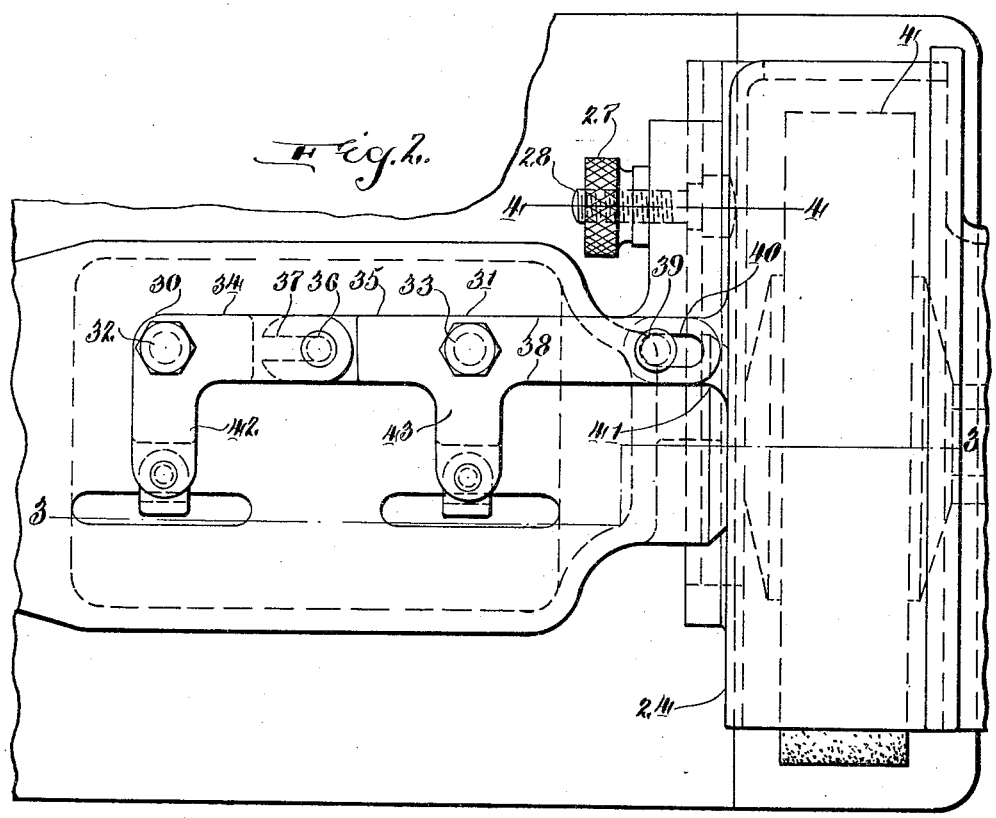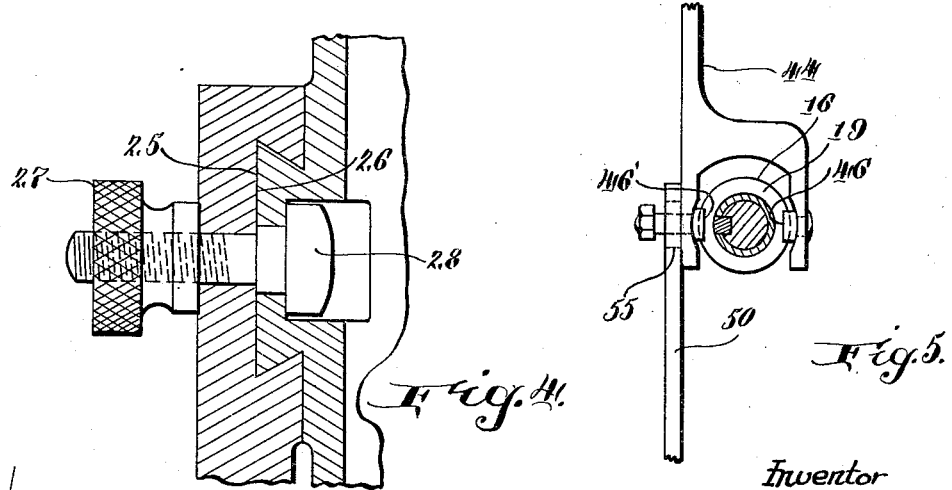

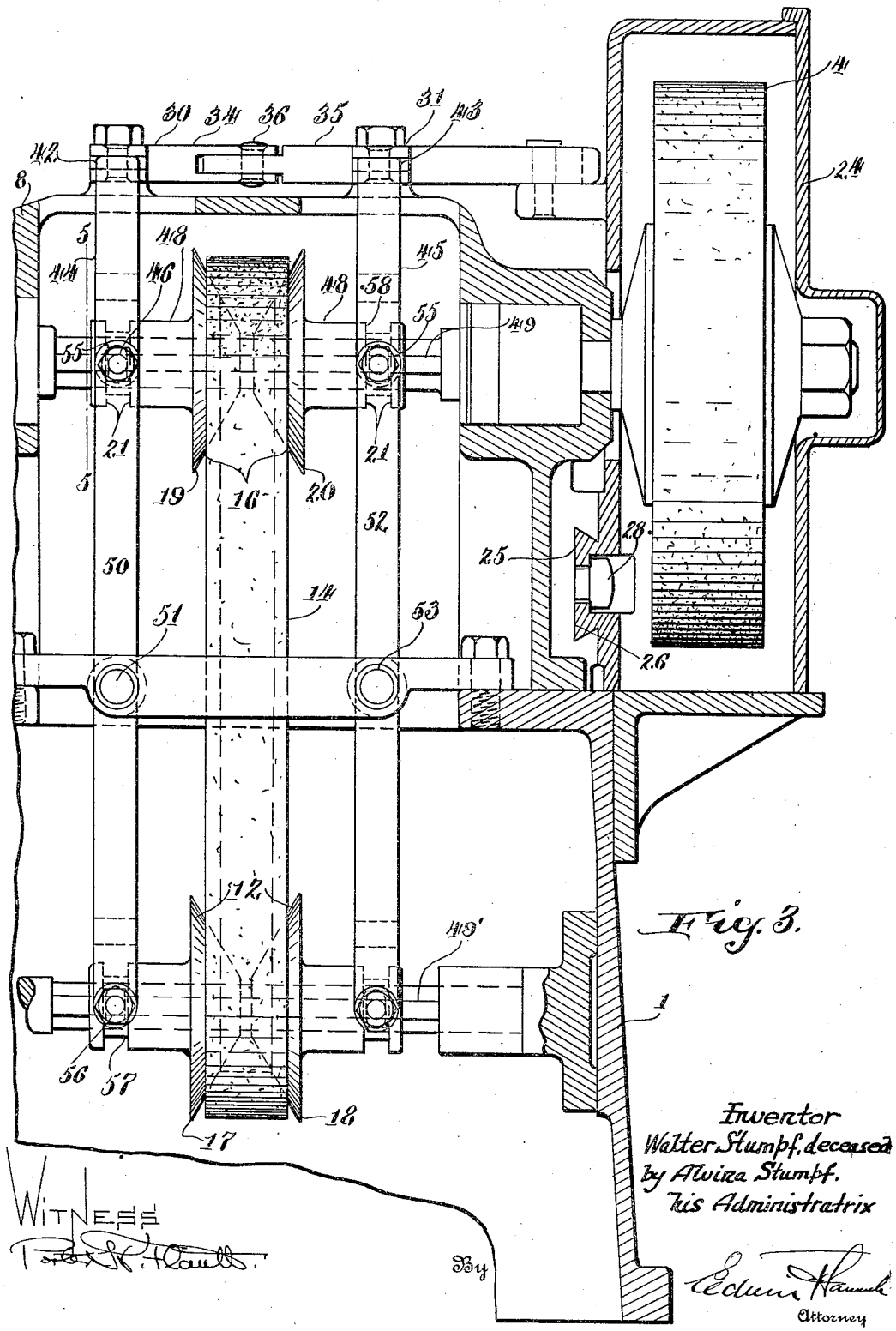

1,911,857

UNITED STATES PATENT OFFICE

WALTER STUMPF, DECEASED, LATE OF TOWSON HEIGHTS, MARYLAND, BY ALVINA STUMPF, ADMINISTRATRIX, OF TOWSON HEIGHTS, MARYLAND, ASSIGNOR TO MARSCHKE MANUFACTURING COMPANY, OF TOWSON, MARYLAND, A CORPORATION OF INDIANA

GRINDER SPEED CONTROL

Application filed May 8, 1929. Serial No. 361,422.

The fact that grinding wheels are rapidly abraded and reduced in diameter and from time to time replaced with full sized wheels, giving a continual variation of wheel diameter, and the further fact that the high peripheral speeds or surface speeds which may be employed are definitely limited on account of the tendency of the wheel to break by centrifugal force, are well known. This condition has been met to a certain degree by the provision of various speed controls which are mainly adaptable to motor driven grinders. In the operation of this control the surface speed is limited and regulated by means of a rheostat or other speed regulating element introduced into the circuit and connected to the wheel guard or some other member as a tool nut which is kept near the peripheral surface of the wheel and which is adjustably supported so that it can be moved toward and from the center of the wheel as the wheel is worn away and a new wheel substituted therefor. The speed of rotation is increased as this adjustable member is moved toward the center and decreased as it is moved in the opposite direction, the angular or rotary speed being in this way made inversely proportionate to the diameter, limiting the surface speed of the wheel under all circumstances as its diameter varies to a predetermined number of linear units per unit of time and a predetermined safe speed, and keeping the speed substantially constant when the guard or equivalent member is kept in uniform relation to the wheel. This latter result is important to the most efficient use of the grinder. An electric motor, in order to give the desired regulation, must be of the direct current type, and, as the majority of shops are equipped for and with alternating current, the necessity for the use of a direct current motor is an obstacle to the general adoption of this type of apparatus. While the squirrel cage type of motor is capable of a variable speed, this is in definite ratios and in order to accomplish the desired result in regulating grinder wheel speed, a gradual increase and decrease with an indefinite number of speeds is desirable.

The present invention relates to a mechanical speed control for grinder wheels whereby such a wheel driven from any source of rotation having a constant or controlled variation of speed, may be regulated to give a constant surface speed as the diameter of the wheel varies, the necessary adjustment being made, or a controlled surface speed, the speed control being connected to the guard or to any convenient means adjustable toward and from the center of the wheel, its approach to the center being limited by contact with the peripheral surface and hence by the diameter of the wheel and variable therewith to vary the rotary speed inversely to the variation of wheel diameter.

An important advantage of the improved speed control is that it may be used where two or more wheels are driven by a single motor to regulate the speed of each wheel to give a constant surface speed independently of the other even though the diameters, as often happens, are different, due to unequal use and wear. This cannot be accomplished by the electric control without separate motors.

In the accompanying drawings there is illustrated a speed control for grinding wheels and the like, embodying the features of my invention in the preferred form, and in connection therewith there is shown so much of a grinding machine as is necessary to illustrate the invention and the manner of applying and using the same.

In the drawings:

Figure 1 is a front elevation of a grinding machine having two grinding wheels operated from a single motor.

Figure 2 is a top plan view of the wheel on the right hand side of the machine showing the speed control mechanism and casing.

Figure 3 is a vertical section on line 3—3 of Figure 2.

Figure 4 is a fragmentary section on the line 4—4 of Figure 2, showing the manner of supporting the wheel guard for adjustment.

Figure 5 is a fragmentary elevation looking at the shifting levers and pulleys from the line 5—5 in Figure 3, this figure being, in fact, a sectional elevation on this line.

Referring to the drawings by numerals, each of which is used to indicate the same or similar parts in the different figures, the machine as illustrated in a general way, particularly in Figure 1, consists of a base 1, in which is mounted a drive shaft 2, driven from any suitable source of rotation shown in the form of an electric motor 3, also mounted in the base 1. The machine as illustrated, particularly in Figure 1, is provided with two grinding wheels 4 at the right and 5 at the left, although the essential features of the invention are applicable to a single wheel as illustrated in Figures 2 and 3. These grinder wheels 4 and 5, are mounted on the grinder wheel shafts 6, 7, which, in turn, are supported in suitable bearings in the pulley housings 8 and 9, secured to the base 1, in any suitable manner as by means of bolts 10.

The grinder wheel shafts 6 and 7, are rotatively driven from the drive shaft 2, by a belt and pulley mechanism giving a variable speed ratio, which, in combination with the other features and details of the machine, is the subject of the invention. As this mechanism is duplicated on two sides of the machine as shown in Figure 1, in connection with each of the grinder wheels 4 and 5 the description will be confined to the unit on the right.

In the form of the invention shown in Figures 1 and 3, the drive shaft 2 carries a V or other suitably grooved pulley 12, on each side of the motor 3, which pulley drives a belt 14 of similar cross section fitting the groove 15 in the pulley 12. This belt 14, in turn, drives a V grooved pulley 16 on the grinder wheel or driven shaft 6 or 7, carrying the grinder wheel 4 or 5, respectively. With the mechanism thus described, the respective grinder wheel shafts 6 or 7, would be driven from the drive shaft 2 at a constant speed ratio.

In order to obtain the desired variation of speed and speed ratio, in accordance with the preferred form of the present invention, the pulleys 12 and 16 are, in the form of the invention shown, so constructed that the effective diameter of one or both of them may be varied, preferably both are varied, simultaneously and inversely so that the average diameter and the total of the diameters of each pair of cooperating pulleys, 12 and 16, and hence the tension of the belt or belts 14 remain constant.

To this end, to accomplish the desired variation in effective diameter of the respective pulleys, each pulley consists of two opposed frustoconical sections, the pulley or pulleys 12 consisting of sections 17, 18, and the pulley or pulleys 16 of sections 19 and 20, whereby the width of the grooves and hence the effective diameters of the pulleys may be varied by changing the distances between the sections measured in the direction of the axis. This may be done by moving either or both sections along the shaft. The sections 17 and 18 of the pulley 12 are keyed to and mounted to slide upon the drive shaft 2, and the sections 19 and 20 of the pulley 16 are keyed and mounted to slide upon the driven or grinder wheel shaft 6 or 7. The frustoconical sections of each pulley are placed with their short diameters juxtaposed so as to form the V grooves already referred to, their hubs 48 being on the opposite or large diameter side.

In the form of the invention shown, these hubs are grooved circumferentially at 21 or otherwise formed for convenient engagement with the shifting levers to be described.

Referring particularly to Figure 2, also to Figures 1 and 3, it will be noted that each of the wheels is provided with a guard 24 mounted for adjustment in a fore and aft direction, i. e., toward and from the operator in a plane parallel to the plane of rotation of the wheels, being secured in any suitable manner as by means of a dovetailed or trapezoidal rib 25, fitting in a corresponding groove 26, in the frame or housing 8, 9, being held in adjusted position in any suitable manner, as by means of a thumb nut 27, engaging a bolt 28, Figure 4, which extends outwardly through the rib, the nut being screwed down against the frame, setting up a tension between the cooperating members 25, 26, and holding the guard in any desired position of adjustment in a fore and aft direction which direction is further determined by the fact that the view Figure 1 is taken from the front of the machine.

In accordance with the theory of operation of the invention, the speed ratio between the drive shaft 2 and the grinder wheel shafts 6, 7, is to be varied in accordance with the position of the wheel guard, the motion of the guard or any equivalent member toward the center of the wheel being, of course, limited by the diameter of the wheel so that this speed ratio, and hence the speed of rotation of the wheel, is likewise limited and determined whereby when the guard is adjusted to positions close to the working surface of the wheel, the speed of rotation of the wheel varies inversely as the diameter of the wheel, or nearly so, the surface speed being under the said conditions of adjustment of the guard maintained substantially constant. To this end the motion of the guard is communicated to the pulley sections 17, 18, 19, 20, in any suitable manner, the form in which the invention has been developed as illustrated in the drawings, comprising a pair of bell crank levers 30 and 31, pivotally mounted on suitable studs 32 and 33, or other convenient means shown as seated in the frame. These bell crank levers have two corresponding arms, 34 and 35, connected in any suitable manner. As shown, they are overlapped and connected by a pin and slot connection 36, 37, to swing together, the bell crank lever 31 adjacent the housing 24 having an additional arm 38, so that it is, in fact, a T lever, the arm 38, which may be referred to as the operating arm, or any convenient portion of the lever, being connected by means of a pin and slot connection 39, 40, to the guard 24, which is shown as provided with a lug 41 for this purpose. The bell crank levers 30 and 31, as thus connected, and the arms 34 and 35, being preferably equal, swing oppositely i. e. right and left handedly and simultaneously as the guard is moved back and forth in a fore and aft direction. These levers 30 and 31 as shown are provided with parallel arms 42 and 43, respectively, extending in the form of the invention shown in a forward direction and each of these arms, the arms being shown as of substantially the same length, is provided at its forward end with a depending arm, the arm 42 having a depending arm 44, see Figures 1 and 3, and the arm 43 having a depending arm 45. These arms, which may, if desired, be forked as shown in Figure 4, are provided near their ends with laterally extending studs or pins 46, which engage corresponding peripheral grooves 21 in the hubs 48 of the pulley sections 19 and 20 of the grooved sectional cone pulley 16, so that these sections are caused to separate from and approach each other, decreasing and increasing the effective diameter of the combined pulley 16, as the guard is moved toward and from the center of the wheel, it being understood that the belt 14 will move inwardly and outwardly radially, occupying the portion of the groove which corresponds in width to its thickness between the inclined surface of the V belt 14.

In order to accomplish the method of operation outlined, whereby the effective diameters of the pulleys 12 and 16 are varied inversely to each other as the guard or equivalent member is operated toward and from the center of the grinder wheel as the diameter of the wheel varies, to control the maximum surface speed of the wheel and establish and maintain a constant limitation thereof, the sections 17, 18 of the pulley 12 may approach each other or move one toward the other as the sections 19, 20 of the pulley 16 are moved apart or one away from the other and vice versa.

In the form of the invention shown, this is accomplished by connecting the corresponding sections 17 of the pulley 12, and 19 of the pulley 16 by means of an intermediately pivoted two arm lever 50, pivotally mounted on the frame at 51, the pulley sections 18 and 20 being in the preferred form shown similarly connected, though this is not essential to the result. This connection is effected by a lever 52 pivotally mounted on the center of the frame by means of a stud 53, it being understood in this connection that both pulleys 12, 16, are as aforesaid, composed of the sections 17, 18, 19 and 20, keyed to their respective shafts by means of keys 49, 49′, on which keys one or both sections slide in the direction of the length of the shaft, being caused by the key to rotate with the shaft. While both sections of each pulley are shown as sliding one toward the other and vice versa, it is not essential to the principle of the operation that both sections be mounted to slide.

In accordance with the form of the invention illustrated, the lever 50, described as intermediately pivoted at 51, is operatively connected to the section 19 of the upper pulley 16 by means of one of the studs 46, see Figure 5, by which the depending arm 44 is connected thereto. As shown, the stud 46 occupies a slot 55 in the lever 51. The lever 51 engages section 17 of the pulley 12 at its opposite end in any suitable manner as by means of a stud 56 on the lever, engaging a peripheral slot 57, in the hub of the pulley section 17. Stud 46 is shown elongated to allow for lateral play of lever 50 due to the depth of the arc of its swing. Studs 46 are spaced away from the bottom of groove 19 to allow for lateral motion of the arm 44 due to the swing of arms 42 and 43.

In the form of the invention shown, the depending arm 45 of the second bell crank lever 31 engages the pulley section 20 of the upper pulley 16 or the stud 46 in the groove 21 therein in the same manner as described regarding the depending arm 44, and the pulley sections 20 of the pulley 16, and 18 of the pulley 12 are connected together to be moved oppositely to each other and simultaneously by the centrally pivoted connecting lever 52 in the same manner as the lever 50 connects pulley sections 17 and 19, though it is not regarded as essential to the actual operation of the invention that more than one section of each pulley be thus moved to vary simultaneously and oppositely the diameters of the respective pulleys 15 and 16, to change the speed ratio of the shafts 6 and 7 relatively to the driving shaft 2 and control the surface speed of the grinding wheels 4 and 5 as already described.

In the operation of the machine the grinder wheels are rapidly worn down or abraded, reducing the diameter and surface speed. When a wheel is worn beyond a certain minimum diameter, it is removed and replaced by a new full sized wheel, which, a constant speed of rotation being assumed would increase the surface speed above the predetermined maximum. In the operation of such grinding wheels the highest surface speed which is commensurate with safety is ordinarily desired and it is, therefore, important to so regulate the operation of the machine as to avoid undue variation of surface speed, permitting the wheel to be operated at all times at the maximum safe speed. As the safe speed is determined by the surface speed and as this safe speed is practically a constant, a variation of the speed of rotation which is substantially in inverse proportion to the variation in diameter of the grinder wheel and hence the length of the grinding surface, is desirable.

In the various electrical controls this is obtained by connecting a rheostat or other speed controlling means to the wheel guard, it being understood that in the operation of the grinding wheel the guard opening at the front, i. e., the front portion of the guard, is kept in close proximity to the surface of the wheel, the guard being preferably out of contact with the wheel. In the operation of the present machine, the guard is also adjusted back and forth to keep the front portion of the guard in close proximity to the grinding surface of the wheel. When a new wheel is substituted for the old one, the guard is moved well forward and as the wheel wears down the guard is moved to the rear from time to time to give free access to the grinding surface of the wheel.

This forward and rearward motion of the guard, in conformance with the diameter of the wheel, transmits a corresponding change of position by way of the arm 38 to the bell crank lever 31, and from this lever 31 to the bell crank 30 and hence from both the bell cranks 30 and 31 by way of the depending arms 44 and 45 to the sections 19 and 20 of the pulley 16. In other words, one section of the pulley is moved toward the other as the guard is moved forwardly, the diameter of the grinder wheel being increased as by the substitution of a new wheel, i. e., as the guard is moved forwardly, the pulley sections are caused to approach one to the other, forcing the belt 14 outwardly and increasing the effective diameter of the pulley and reducing the angular speed or speed of rotation of the grinder wheel shaft 6 or 7.

As the size of the wheel is reduced, the guard is moved to the rear in order to give free access to the grinder wheel and the pulley sections are moved apart permitting the belt 14 to approach the center of the pulley and reducing the effective diameter of the pulley so that the angular speed of the grinder wheel shaft 6 or 7 is increased and the surface speed of the grinder wheel is maintained substantially constant, it being understood that when the guard is kept in uniform relation to the wheel, the speed of rotation is increased and decreased in inverse proportion to the diameter or substantially so.

In the preferred form of the invention illustrated, the tension of the belt is maintained constant though this regulation of belt tension may be otherwise accomplished and the desired change of angular speed of the driven shaft 6 or 7 is attained and maintained substantially in inverse proportion to the diameter of the grinding wheel by varying the diameter of the drive pulley 12, as well as that of the driven pulley 16, the drive pulley 12 being increased as to its effective diameter as the diameter of the driven pulley 16 is decreased and vice versa. The corresponding and opposite variation as to the effective diameter of the pulley 12 is effected in the present instance by means of the levers 50 and 52, which are intermediately pivoted, being connected at one end to the sections 19 and 20 of the driven pulley 16 and at their opposite ends to the corresponding sections 17, 18 of the drive pulley 12, communicating the motion of the sections of the driven pulley in an opposite phase to the corresponding sections of the drive pulley.

It will be understood that the construction shown is the preferred construction, the variation of the effective diameters of both pulleys and the movement of both sections of the respective pulleys in varying these diameters not being regarded as essential under all circumstances to the useful operation of the device.

There is thus described specifically and in detail a machine embodying the invention in the preferred form in order that the manner of constructing, operating and using the same may be fully understood. However, the various features and details are capable of wide variation within the scope of the invention and the specific terms herein are used descriptively rather than in a limiting sense, the scope of the invention being defined in the claims.

What is claimed as new and desired to be secured by Letters Patent is:

1. The combination in a variable speed drive and control for a grinder wheel, comprising a plurality of pulleys and a belt connecting the same, one said pulley being expansible, said expansible pulley comprising opposed frustoconical sections, forming a V shaped groove for the belt, one said section being mounted to move in the direction of its axis, a member adjustable toward and from and limited in its motion by the peripheral surface of the wheel, and means connecting said member to said section which is movably mounted, moving the same as said member is moved changing the effective diameter of the said expansible pulley to change the speed ratio between said source of rotation and said wheel tending to limit the surface speed of the wheel to a predetermined maximum and to keep it constant when said member is kept in uniform relation to the peripheral surface of the wheel.

2. The combination in a variable speed drive and control for a grinder wheel, comprising a plurality of pulleys and a belt connecting the same, one said pulley being expansible, said expansible pulley comprising opposed frustoconical sections forming a V shaped groove for the belt, one said section being mounted to move in the direction of the axis, a member adjustable toward and from and limited in its motion by the peripheral surface of the wheel, and means connecting said member to said section which is movably mounted moving the same as said member is moved changing the effective diameter of the said expansible pulley to change the speed ratio between said source of rotation and said wheel, tending to limit the surface speed of the wheel to a predetermined maximum, and to keep it constant when said member is kept in uniform relation to the peripheral surface of the wheel, said connecting means comprising a bell crank lever.

3. The combination in a drive and control for a grinder wheel, comprising a plurality of pulleys and a belt connecting the same, one of said pulleys being expansible, said expansible pulley comprising opposed frustoconical sections forming a V groove and both said sections being mounted to slide in the direction of the axis to vary the effective diameter of the pulley, a member adjustable toward and from and limited in its motion by the peripheral surface of the wheel and means connecting said member to said sections comprising two bell crank levers connected together to swing oppositely, means connecting each said bell crank lever to a corresponding section of the expansible pulley whereby the diameter of the pulley is changed correspondingly to the diameter of the wheel to maintain a substantially constant surface speed of the wheel and means for maintaining the tension of the belt.

4. The combination in a variable speed drive and control for a grinder wheel, comprising a plurality of expansible pulleys and a belt connecting the same, a member adjustable toward and limited in its motion by the peripheral surface of the wheel, said pulleys each comprising opposed frustoconical sections, one said section of each pulley being mounted to move in the direction of its axis, a bell crank lever connected to the said movable member and to said sliding section of one pulley to move the same as said member is moved, and a centrally pivoted member connecting that section to the movable section of the other pulley to move the same, changing the effective diameters of said pulleys simultaneously and oppositely, and tending to limit the surface speed of the wheel.

5. The combination in a variable speed drive and control for a grinder wheel, comprising a plurality of expansible pulleys and a belt connecting the same, a member adjustable toward and limited in its motion by the peripheral surface of the wheel, said pulleys each comprising opposed frustoconical sliding sections, bell crank levers connected to the said movable members, one said lever being connected to each section of one pulley to move the same as said member is moved, and a centrally pivoted member connecting each section to a corresponding section of the other pulley to move the same simultaneously and oppositely, to vary the effective diameter of each pulley simultaneously and oppositely to the other, tending to increase the speed of rotation of the wheel as its diameter is reduced and vice versa.

6. The combination in a variable speed drive and control for a grinding or similar wheel which is subject to variation of diameter comprising expansible pulleys having V grooves and composed of frustoconical sections, means for moving one of the sections of each pulley simultaneously to vary oppositely the effective diameters of the pulleys, a movable member adapted to contact the wheel, the motion of which is limited by the diameter of the wheel and means in the form of a bell crank lever, connected to said means for moving the pulley sections, and to said member.

7. The combination in a variable speed drive and control for a grinding or similar wheel which is subject to variation of diameter comprising expansible pulleys having V grooves and composed of frustoconical sections, means for moving one of the sections of each pulley simultaneously to vary oppositely the eeffctive diameters of the pulleys, a movable member adapted to contact the wheel, the motion of which is limited by the diameter of the wheel, and means connected to said means for moving the pulley sections, and to said member.

Signed at Towson Heights, Baltimore County, Maryland, this 25th day of April, 1929.

ALVINA STUMPF,
*Administratrix of Walter Stumpf, Deceased.*